US012636717B1

(12) United States Patent
Knecht

(10) Patent No.: US 12,636,717 B1
(45) Date of Patent: May 26, 2026

(54) CUTTING INSERT AND CRANK SHAFT MILLING TOOL

(71) Applicant: SANDVIK INTELLECTUAL PROPERTY AB, Sandviken (SE)

(72) Inventor: Stefan Knecht, Meerbusch (DE)

(73) Assignee: Sandvik Intellectual Property AB, Sandviken (SE)

( * ) Notice: Subject to any disclaimer, the term of this patent is extended or adjusted under 35 U.S.C. 154(b) by 824 days.

(21) Appl. No.: 17/973,029

(22) Filed: Oct. 25, 2022

Related U.S. Application Data

(62) Division of application No. 16/647,013, filed on Mar. 12, 2020, now Pat. No. 11,541,467.

(51) Int. Cl.
| | |
|---|---|
| *B23C 5/20* | (2006.01) |
| *B23C 3/06* | (2006.01) |
| *B23C 5/08* | (2006.01) |
| *B23C 5/22* | (2006.01) |

(52) U.S. Cl.
CPC .................. *B23C 3/06* (2013.01); *B23C 5/08* (2013.01); *B23C 5/202* (2013.01); *B23C 2200/0433* (2013.01); *B23C 2200/0438* (2013.01); *B23C 2200/125* (2013.01); *B23C 2200/28* (2013.01)

(58) Field of Classification Search
CPC .. B23C 3/06; B23C 5/08; B23C 5/202; B23C 2200/0433; B23C 2200/0438; B23C 2200/28; B23C 2215/20; B23C 2200/203; B23C 2200/3663; B23C 2200/286; B23C 2200/085; B23C 5/2226; B23C 5/2489; B23C 5/24; B23C 5/2462; Y10T 407/245; Y10T 407/235; Y10T 407/24; Y10T 407/1936; Y10T 407/1928
See application file for complete search history.

(56) References Cited

U.S. PATENT DOCUMENTS

| | | | | |
|---|---|---|---|---|
| 3,303,555 | A | * | 2/1967 | Milewski .............. B23C 5/2278 407/41 |
| 3,378,901 | A | * | 4/1968 | Dupuis ................. B23C 5/2479 407/85 |
| 3,487,535 | A | * | 1/1970 | Begle .................... B23C 5/2475 29/464 |
| 3,497,933 | A | * | 3/1970 | Okada ................... B23C 5/2278 408/199 |
| 3,818,562 | A | * | 6/1974 | Lacey ....................... B23C 5/20 407/100 |

(Continued)

FOREIGN PATENT DOCUMENTS

| | | | | | |
|---|---|---|---|---|---|
| JP | | 60186311 A | * | 3/1984 | ............. B23C 5/202 |

*Primary Examiner* — Sara Addisu
(74) *Attorney, Agent, or Firm* — Corinne R. Gorski

(57) ABSTRACT

A disc milling tool including cutting inserts is provided. The cutting insert includes a top face and a bottom face parallel to the top face. Four side faces and four corner faces extend between the top and bottom faces. At least one cutting edge is formed at an intersection of the top face and at least one of the corner faces and two of the side faces connected to the corner face. The top face forms a rake surface, while an upper part of the corner face and the two side faces form a relief surface connected to the cutting edge. In order to reduce the cycle time for crank shaft milling, the cutting insert has two diagonally opposed corners including an acute angle between 70° and 85°. At least one of the acute angled corners including the corner face providing a corner cutting edge.

4 Claims, 8 Drawing Sheets

(56)                    References Cited

U.S. PATENT DOCUMENTS

| | | | |
|---|---|---|---|
| 4,533,281 A * | 8/1985 | Lacey .................... | B23C 5/2239 |
| | | | 407/47 |
| 4,993,891 A * | 2/1991 | Kaminiski ............... | B24D 7/18 |
| | | | 407/42 |
| 5,242,251 A * | 9/1993 | Armstrong ............. | B23C 5/202 |
| | | | 407/18 |
| 6,805,520 B2 * | 10/2004 | Gesell ........................ | B23C 5/08 |
| | | | 407/113 |
| 9,636,759 B2 * | 5/2017 | Buob .................... | B23C 5/2226 |
| 2003/0113175 A1 * | 6/2003 | Wermeister .......... | B23C 5/2213 |
| | | | 407/113 |
| 2013/0216319 A1 * | 8/2013 | Michelet ................ | B23C 5/202 |
| | | | 407/33 |
| 2020/0254535 A1 * | 8/2020 | Knecht .................. | B23C 5/202 |

* cited by examiner

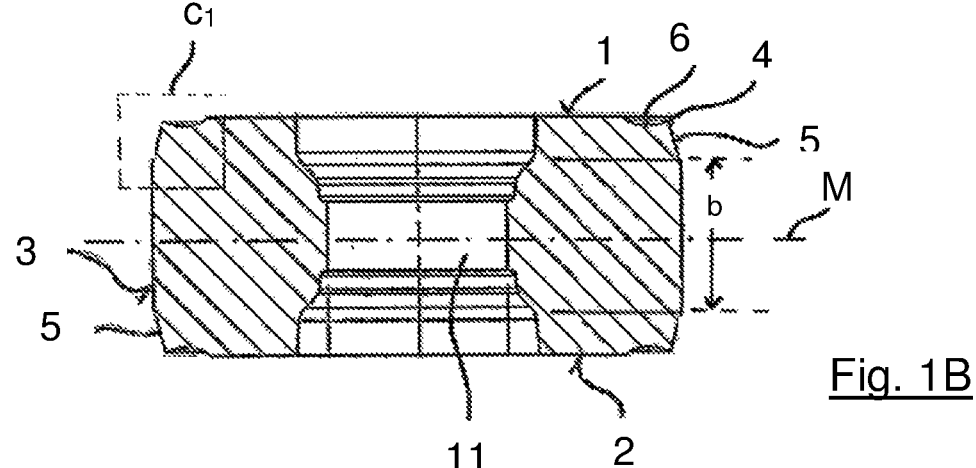
Fig. 1B
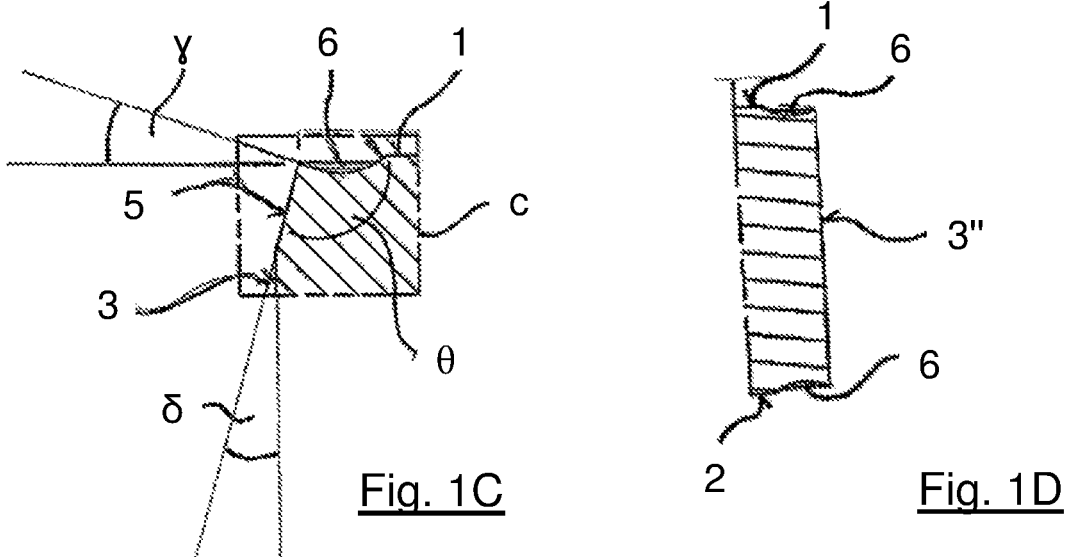
Fig. 1C                    Fig. 1D

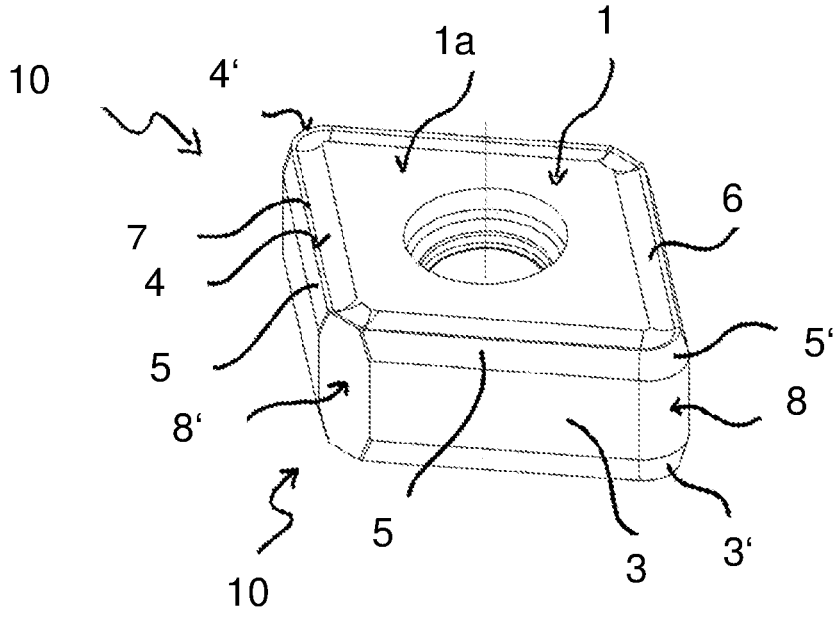
Fig. 2A
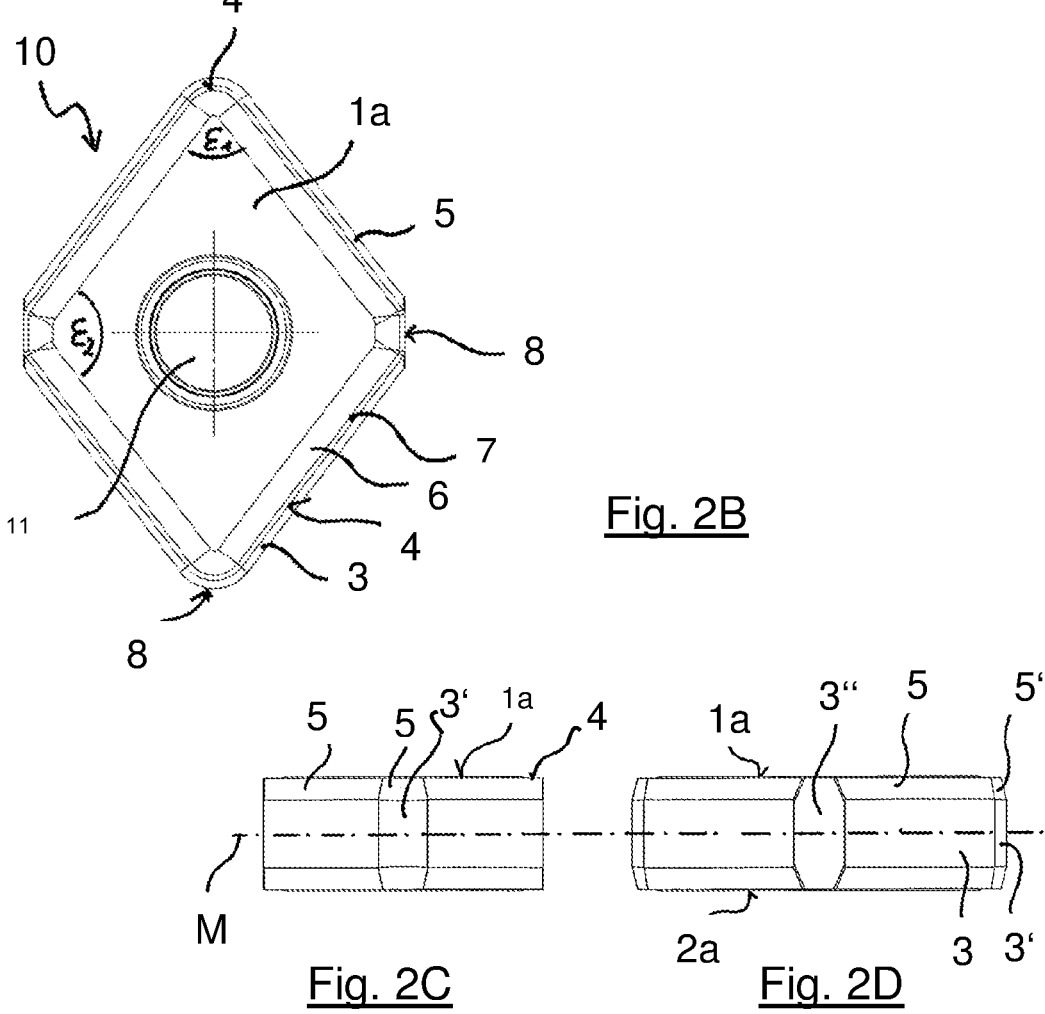
Fig. 2B
Fig. 2C
Fig. 2D

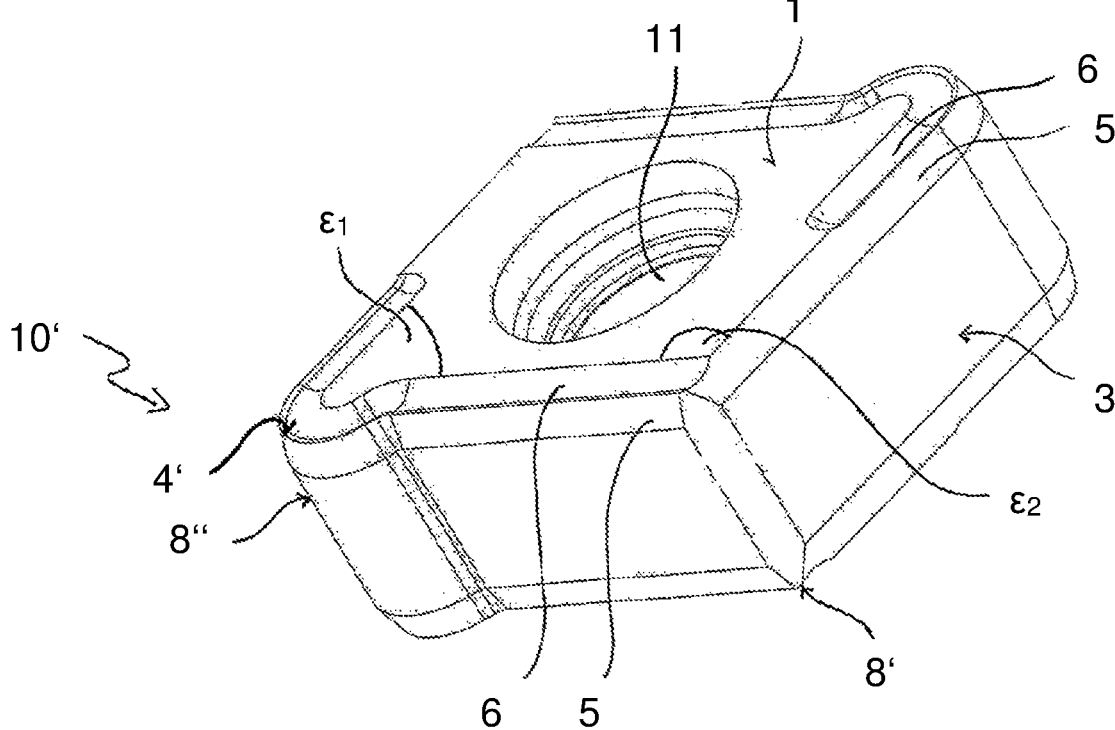
<u>Fig. 3</u>

20

21

21

21

20

20

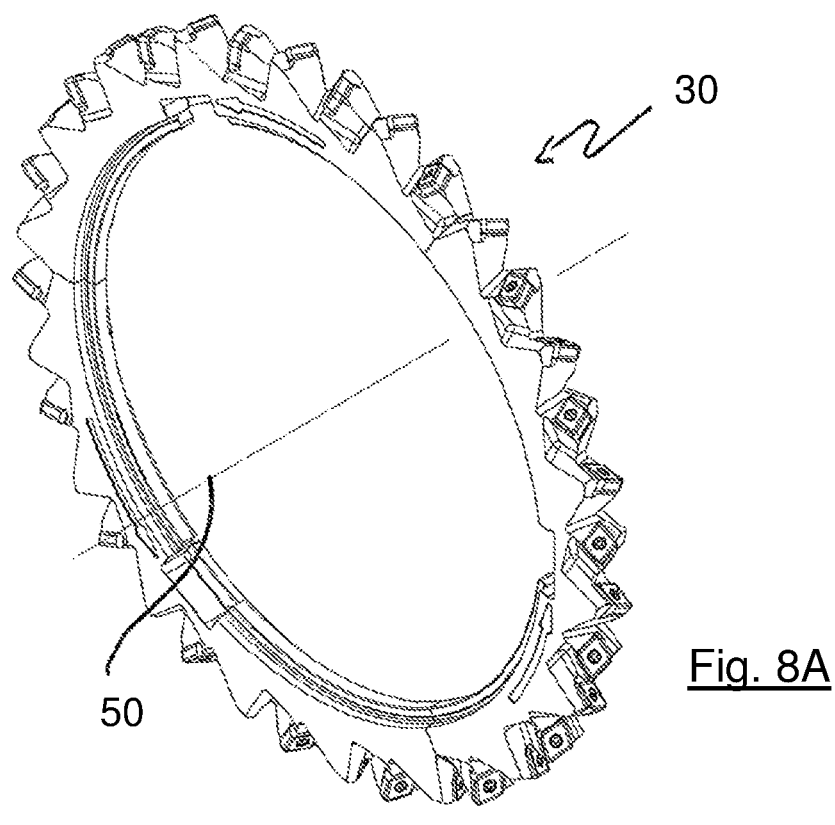
30
50
Fig. 8A
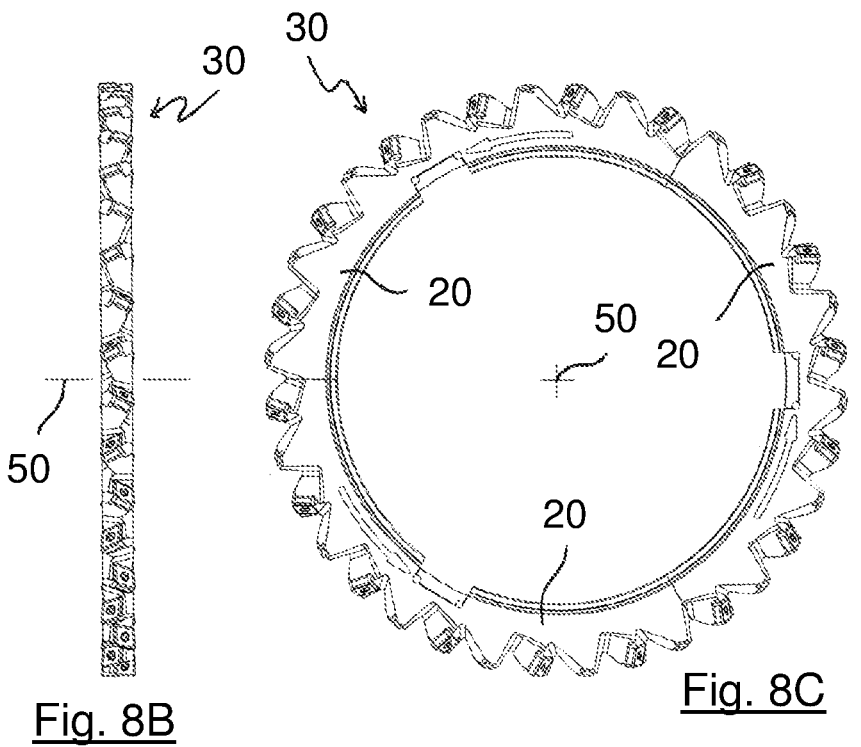
30
30
20
50
20
20
Fig. 8B
Fig. 8C
50

CUTTING INSERT AND CRANK SHAFT MILLING TOOL

RELATED APPLICATION DATA

This application is a divisional of U.S. patent application Ser. No. 16/647,013 filed Mar. 12, 2020, which is a § 371 National Stage Application of PCT International Application No. PCT/EP2018/063650 filed May 24, 2018, claiming priority to EP 17190921.1 filed Sep. 13, 2017.

TECHNICAL FIELD

The present disclosure relates to a cutting insert holder for a crankshaft milling tool and the cutting insert.

BACKGROUND

Cutting inserts having a basic quadrangular shape are well known in the art for a variety of purposes. The cutting insert according to the present invention is specifically designed for a disc shaped milling tool, i.e. for being mounted in an insert seat of a corresponding disc shaped milling tool which may be used for crankshaft and/or camshaft milling. Such a milling tool is generally disc-shaped and has cutting inserts mounted in seats provided along the periphery of the disc at the transition from a peripheral (cylindrical) surface to at least one and preferably both radial surfaces delimiting the disc in the axial direction.

Cutting inserts for crankshaft milling cutters are often provided with a special design reflecting the profile of pin bearings and rotary bearings to be produced and the present invention is also directed to cutting inserts provided for some additional profiling.

However, the general profile to be produced is that of a rectangular groove around a crankshaft body, the bottom of which groove for instance defining the peripheral cylindrical surface of a crank pin or bearing journal of a crankshaft.

Bearing journals and crank pins or cams are typically delimited by radial end faces, extending perpendicular to the axis of the shaft away from the cylindrical surface, which are generally designated as "oil collars" and the cutting inserts are also designed and mounted for generating these radial surfaces of any oil collars adjacent a crank pin or bearing journal.

Even if not described in detail and referred to in this application, the present cutting inserts and also the milling tool equipped with such cutting inserts are as well suited for the milling of camshafts, i. e. the bearing journals and also the cams of a camshaft.

In order to form the crank pins and bearing journals of a crankshaft, disc-shaped milling cutters are typically used which are provided with a plurality of cutting inserts arranged on the periphery of the disc and in particular at the transition from the peripheral surface to the radial surfaces of such disc shaped tools.

Disk-shaped milling cutters for crankshaft milling and also for camshaft milling have typical diameters above 300 mm, and in particular between 700 and 900 mm. These milling cutters are fed towards a crankshaft in the radial direction, while the crankshaft is continuously rotated and the radial distance of the crankshaft from the milling cutter is properly controlled such that the peripheral inserts on the disc-shaped milling cutter generate the respective cylindrical surfaces at the desired positions on the crankshaft.

In view of the large diameter of the corresponding discs, a large number of cutting inserts is mounted along the periphery thereof. In many cases, the cutting inserts are tangentially mounted on the disc, i.e., the larger top- and bottom faces are acting as relief surfaces, while the narrow side faces are used as rake surfaces. Still, since the tangentially mounted cutting inserts extend with their longer dimensions along the circumference of the tool and since also an appropriate chip space needs to be provided, the cutting inserts are typically mounted at a pitch corresponding to at least three times of the widths or lengths of the cutting inserts. If the cutting inserts have central clamping holes, they may be fixed on the milling cutter by means of corresponding screws extending either parallel to the axis of the milling cutter or perpendicular thereto.

In installations that are 20 or more years old, there are still some disc milling cutters on the market that are equipped with radially and/or axially mounted cutting inserts, i.e., with the top face generally facing towards a circumferential direction, while the edge faces extend substantially parallel to the axis or perpendicular thereto along the radial direction.

However, it is hardly possible to reduce the pitch between succeeding cutting inserts when mounted in this manner, at least, as long as the cutting inserts are fixed by means of a central clamping screw. In order to get access to the clamping screw, it is still necessary to have sufficient space between cutting inserts succeeding each other along the circumferential direction. Moreover, with a given pitch, the available chip space is limited by the pitch minus the circumferential dimension of a cutting insert and minus some backing element supporting the rear face of the cutting insert, when seen in the circumferential direction.

While a large pitch between succeeding cutting inserts of the prior art disc-shaped milling cutters provided for crankshaft milling and camshaft milling involves the advantage that sufficient time passes before the same cutting insert engages the workpiece again after one revolution so that the cutting insert may cool down before hitting the workpiece again, such a large pitch between succeeding cutting inserts limits the number of cutting inserts to be mounted along the periphery of the tool and thus reduces the productivity.

Moreover, the chips generated during milling are very hot and tend to stick on the rake surface or in the vicinity thereof, such that a lot of heat is transferred from the chips to the cutting insert.

Thus, it would thus be desirable to have a cutting insert and a corresponding disc-shaped milling cutter designed such as to overcome or obviate some of the aforementioned problems.

SUMMARY

The present disclosure is related to a cutting insert including a top face and a bottom face parallel to the top face, wherein four side faces and four corner faces extend between the top and bottom faces. At least one cutting edge is formed at the intersection of the top face and at least one of the corner faces and two of the side faces connected to the corner face, the top face forming a rake surface, while at least an upper part of the corner face and the two side faces forms a relief surface adjoining the cutting edge.

Such cutting insert, in a plan view on the top face thereof, forms a basic shape of a parallelogram (such as a rhombic basic shape) having two diagonally opposed corners that include an acute angle between 70° and 85°. At least one of the acute angled corners includes the corner face providing a corner cutting edge of the cutting edge. The relief surface forms an obtuse inner angle with the top face, wherein further a chip groove is formed in the top face adjacent to and along the cutting edge.

While cutting inserts having the basic shape of a parallelogram (including a rhombic basic shape) are already known in the art, the basic shape, the particular corner angles and the relief surface of the cutting insert according to the present disclosure specifically allow a mounting in a corresponding milling cutter with a pronounced negative orientation while still maintaining contact of the cutting edges with both, a cylindrical pin surface and an oil collar extending perpendicular thereto.

"Negative orientation" means in this case both, a negative radial and a negative axial rake angle on the cutting insert's top face with respect to the radial (radius) and the axial directions (central axis) of the milling cutter.

In other words, when seen along the circumferential working direction, the cutting insert is tilted such that the active cutting edge at the peripheral surface as well as the radially extending cutting edge forming the oil collar and extending along and parallel to the radial end plane of the disc-shaped milling cutter are following behind the remainder of the cutting insert in the direction of rotation. Thus, the cutting insert is tilted outward and rearward both in the radial, as well as, in the axial direction.

Still, with an appropriate acute angle of the cutting insert, which for instance may be between 72° and 78°, in particular about 75°, the insert, if mounted in a recess on a periphery of the milling cutter body, may generate the bottom of a groove, i.e. the cylindrical surface of a crank pin as well as a limiting face extending perpendicular thereto, which surfaces include a right angle in a cross-section including the axis of the shaft.

With a given angle of the acute corner of the cutting insert as indicated above, the absolute value on both the negative radial and axial rake angle of the cutting insert with respect to either a radial plane and/or a tangential plane provided on the periphery of the disc-shaped milling cutter at the position of the cutting insert, should be at least 20°.

This particular arrangement has a number of advantages. First of all, the strong tilting of the cutting insert with regard to the circumferential direction along which the cutting insert is moved, causes the chips generated at the cutting edges to be removed and radially and axially expelled from the top face of the cutting insert very quickly.

Accordingly, since there is much less contact between the hot chips and the cutting insert, most of the heat generated during cutting is taken away by the chips, which are evacuated much more to the side compared to a conventional cutter and the cutting inserts take up much less heat.

In particular if the cutting insert has a central clamping hole extending from the top to the bottom surface, mounting of these inserts in correspondingly negatively oriented seats is much easier, since the axis of a central clamping holds the same direction as the normal to the top surface which, as demanded, is facing away from the tool body in the radial as well in as in an axial direction. This means, that the clamping hole may be easily accessed from such direction perpendicular to the top face, which in turn allows a much shorter circumferential pitch between the inserts.

Accordingly, with a given diameter of the disc-milling tool, a much larger number of cutting inserts with a closer pitch may be mounted on a correspondingly disc-shaped milling cutter.

The "strongly negative" mounting of the cutting insert provides ample chip space in spite of a fairly narrow pitch. Moreover, and as already mentioned, since the cutting chips are quickly evacuated from the chip space due to the interaction with the negatively oriented top surface of the cutting insert, even less chip space is required. Since the cutting inserts take up less heat, they may engage the workpiece in shorter time intervals, while the cutting disc could even be reduced in diameter but still have the same number of cutting inserts as corresponding tools with larger diameter so that the milling of crankshafts or also of camshafts may be produced with an increased efficiency.

Since the cutting insert is tilted to have a rather large negative rake angle in both, the radial and the axial direction as well, the strength of the cutting edge, which is thus subjected to rather high loads, can be improved by providing the relief surface of the side face at an obtuse inner angle with the top face in order to provide a relief surface which includes a negative clearance. The obtuse inner angle between the relief surface and the top face may hereby be between 100° and 110°, for example, about 100°.

In order to still have a positive or less negative rake angle cutting geometry on the rake surface inside the cutting edge, a chip groove is provided along the cutting edge, wherein according to an embodiment, such chip groove chip groove extends continuously along at least two straight cutting edge portions of the cutting edge including the corner cutting edge there between. The corner cutting edge can be a radius (rounded) corner cutting edge that connects the adjacent ends of the straight cutting edge portions. In one embodiment and seen in a cross-section perpendicular to the cutting edge, a tangent to a chip groove surface portion adjacent to the cutting edge is forming an acute inner angle with the relief surface, typically 85°.

Further, a land may be provided along the cutting edge and may be arranged between the cutting edge and the chip groove, wherein the land is preferably located in a plane parallel to the top face, and in particular in a plane slightly below the top face. A central clamping hole extending through the cutting insert from the top to the bottom face allows the mounting of the cutting inserts with the aid of a central clamping screw. As an alternative of providing a land, the cutting edge may be provided with an edge rounding (or ER) in cross section with a radius such as 0.3 mm.

In one embodiment, the cutting insert is an indexable cutting insert with an identical cutting edge provided along the other of the acute angled corners and the other two side faces of the basic shape of the parallelogram, wherein the cutting insert is also a double-sided insert having a bottom face which is identical to the top face. In other words, the cutting insert is four times indexable with two identical and indexable cutting edges on each of the top and bottom faces. The distance between the top face and the bottom face, i.e., the thickness of the cutting insert, is typically between 4 and 8 mm, and for example, between 6 and 6.5 mm.

In one embodiment, the side face includes a flat surface portion extending perpendicularly to the top face and located adjacent the relief surface, wherein a width of the flat surface portion measured perpendicular to the top face may be between 50% and 80% of the distance between the top- and bottom faces. The width of the flat surface portion may be in the range between 55% and 62% of the thickness of the cutting insert.

The cutting insert in the mentioned embodiments may be produced by sintering a cemented carbide body, which is uniaxially pressed before sintering, i.e., the cutting insert does not require any multiaxial pressing.

While the acute angle on the two diagonally opposite corners of cutting insert is indispensable for a mounting with fairly large negative radial and axial rake angles, a precisely rhombic shape is not required. In other words, the two cutting edges adjacent the same acute angled corner need not to have the same length, because they are provided to engage different portions of the crankshaft, i.e., the cylindrical surface of a pin or journal and the radial oil collar, respectively. However, the rhombic shape does not only allow indexing of the cutting inserts within its seat, but also the exchange of cutting inserts between opposite sides of the milling cutter disk which would not fit in the same manner if the cutting edges should have different lengths.

As already mentioned, the present disclosure is also directed to a cutting insert holder for a crankshaft milling tool. The holder includes an at least part cylindrical body having at least a part cylindrical, peripheral surface section and two oppositely arranged radial faces joining the peripheral surface, wherein cutting insert seats are formed as recesses at the transition of at least one of the radial surfaces to the peripheral surface. The insert seats have a bottom support surface and at least two side support surfaces extending perpendicular to the bottom support surface.

According to the present disclosure, the surface normal of the bottom surface points axially and radially away from the at least part cylindrical body at a negative axial rake angle ($\alpha$) at an absolute value of at least 10° with respect to a radial plane and by a negative radial rake angle ($\beta$) at an absolute value of at least 8° with respect to a tangential plane to the peripheral cylindrical surface at the location of the bottom of the insert seats and extending through the center of the bottom support surface. It may be noted that the rake face of each of the cutting inserts mounted in such a recess will of course have the same orientation as the bottom surface of the corresponding insert seats which means that also the face normal of the cutting insert is pointing away by a corresponding angle.

In one embodiment, the absolute value of the negative axial rake angle $\alpha$, defining a deviation of the surface normal from the radial plane, is larger than 15°, for example, more than 22° or about 27°, and the absolute value on the negative radial rake angle $\beta$, defining the angle between a surface normal and a tangential plane, is more than 12°, for example, larger than 20° or about 24°. The advantages involved with the particular negative orientation of the cutting inserts and the respective insert seats have already been described above.

The bottom support surface of the cutting insert seats includes a substantially central, threaded clamping hole. The term "substantially central" means in this context, that the hole is arranged in the bottom support surface of the insert seat close to the center of the bottom support surface, which is configured to support the bottom face of the respective cutting inserts to be received therein. The threaded hole may be provided at a distance from the side support surfaces, which distance is slightly smaller than a distance between the corresponding side surfaces and the clamping hole of the cutting insert in order to ensure a positive clamping force not only towards the bottom support surface but also towards the side support surfaces of the seat.

Upon a mounting of the cutting insert by means of the clamping screw in the corresponding threaded hole, the cutting insert with its bottom face is pressed towards the bottom support surface of the seat, wherein the side surfaces with their flat surface portions (adjacent the relief surface), are abutting on the side support surfaces of the seat extending perpendicular to the bottom support surface thereof, wherein these side support surfaces include an angle with each other, corresponding to the acute angle of the parallelogram or rhombic basic shape of the cutting insert.

In one embodiment of a cutting insert holder, the insert seats, which are formed as the recesses at opposite radial surfaces, have a mirror symmetric shape and arrangement, except from being relatively shifted along the circumferential direction. This means that between any two insert seats provided at the transition of one radial surface to the peripheral surface another insert seat is provided between these seats but on the opposite side, i.e., at the transition from the oppositely arranged radial surface to the peripheral surface, wherein the seats on opposite radial surfaces have a mirror symmetric shape and orientation.

The present disclosure is further directed to a crankshaft milling tool including an insert holder as described heretofore, which is equipped with cutting inserts according to any of above mentioned embodiments. The advantages of such cutting inserts and the arrangement thereof have already been described above.

As a result of the orientation of the bottom support surface of the insert seats, together with the cutting inserts as described before, the cutting inserts are tipped with a negative axial rake angle of at least 10°, for example, more than 15°, more than 22°, or about 27°, and with a negative radial rake angle of at least 8°, for example, more than 12°, more than 20°, or about 24°.

In this context, a negative radial rake angle of more than 20° refers to the absolute value and means a negative rake angle <−20°, such as −22°.

The orientation of the insert seats and in particular of the side support surfaces on which the corresponding side faces of a cutting insert abut, are so arranged that at least one cutting edge of each cutting insert adjoining an acute angled cutting corner extends in a tangential plane, while another cutting edge of the same insert and adjoining the same cutting corner extends was in a radial plane which actually means, that the surfaces generated by the two cutting edges extending from the same acute angled cutting corner are generating surfaces which are perpendicular to each other.

Some or all of the cutting inserts as described above may be slightly modified by providing some extension on the acute angled corner projecting towards the radial direction such as to generate an undercut in at the transition from the cylindrical surface of a crank pin or bearing journal to an oil collar.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF DRAWINGS

FIG. 1B is a cross-section taken along line section B-B of FIG. 1A.

FIG. 1C is a detail $C_1$ from FIG. 1B.

FIG. 1D is a partial cross-section taken along line D-D of FIG. 1A.

FIGS. 2A-D illustrate respectively a perspective view; top/plan and two different side views of the present cutting insert.

FIG. 3 is a perspective view of another embodiment of a cutting insert designed to additionally generate a relief groove.

FIGS. 8A-C shows a perspective view and two different side views of a complete ring shaped cutting insert holder having three ring sector bodies according to FIGS. 6 and 7.

DETAILED DESCRIPTION

FIGS. 1A to 1D and 2A to 2D are commonly described in the following paragraphs.

Figure 1A:
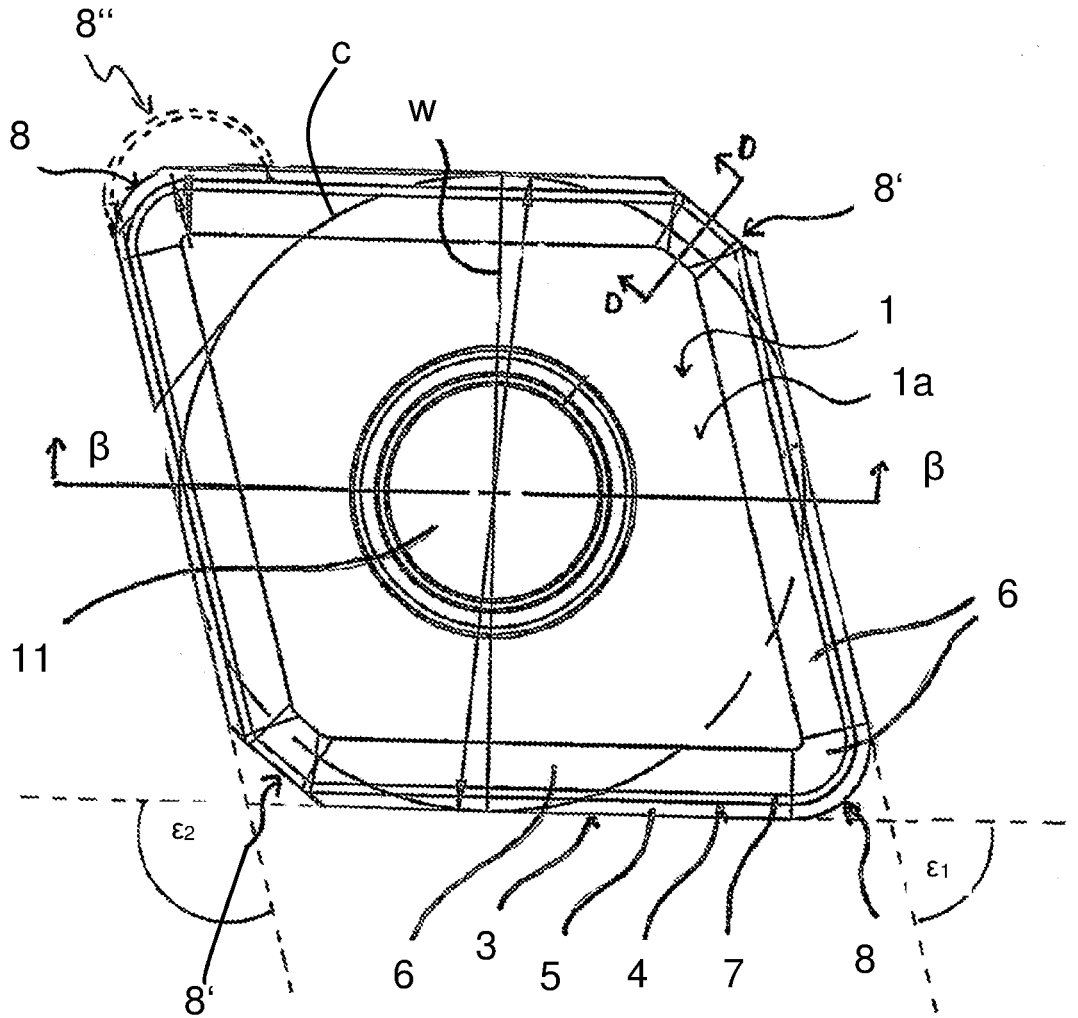
FIG. 1A is a top or plan view on a cutting insert according to the present disclosure.

As can be seen from FIG. 1A, cutting insert 10 has the basic shape of a parallelogram, more precisely in the form of a rhombic basic shape with an acute angle 81 of the rhombic shape of about 75° at two diagonally opposed, but otherwise identical acute corners 8, each having a correspondingly curved corner cutting edge 4', which is contiguous with adjacent straight cutting edges 4 extending parallel to straight side faces 3. The remaining diagonally opposed obtuse corners 8' are not designed for cutting, even though a chip groove 6 extends continuously around a central planar portion 1a on a top face 1 of the cutting insert 10.

The cutting insert is mirror symmetric with respect to a mid-plane M shown in FIG. 1B. In summary, the cutting insert is double-sided with a top face 1 and a bottom face 2 identical with the top face 1, wherein both faces 1, 2 are parallel to each other and are planar faces except for a central clamping hole 11 and a chip groove 6 surrounding a central planar portion 1a on each of the top and bottom faces. The cutting insert 10 includes four side faces 3 and four corner faces 3', 3", wherein cutting edges 4, 4' are formed by the intersection of the top/bottom face 1, 2 with relief surface portions 5, 5' of the side faces 3 and the acute corner faces 3'.

The chip groove 6 extends continuously along a first straight cutting edge portion 4, an adjacent acute angled corner cutting edge 4' and another straight cutting edge portion 4 adjoining the same acute corner cutting edge 4'. With the opposite cutting corner 8, there is again a chip groove 6 extending continuously along two straight cutting edge portions 4 and along the rounded, acute angled corner cutting edge 4'. The chip groove 6 in the shown embodiment also extends along the obtuse corners 8', whereby the chip groove is forming a single endless groove on the top face of the cutting insert. The bottom face 2 on the double-sided cutting insert in this embodiment is hereby identical to the top face 1. In other words, the cutting insert is four times indexable by including two indexable cutting edges 4 on each of the top and bottom faces including the chip groove 6, which is extending continuously along the cutting edges. Hence, the cutting insert may be used in four index positions on a disc shaped cutting tool (shown in FIG. 6).

The obtuse corners 8' defining a corner angle 22 of about 105° do not have any relief surface forming an obtuse inner angle with the top face 1. Instead, a side face 3" at the obtuse corner 8' constitutes a single surface extending perpendicularly in relation to the top face 1 as visible in the cross-sectional view of FIG. 1D and also visible in FIGS. 2A to 2D at these corners 8'.

The acute corners 8 are curved with a radius between 1 and 2 mm. A width w of the cutting insert, measured between two oppositely arranged side faces 3, is about 12 to 15 mm, for example, 14 mm. The width w also defines the diameter of an inscribed circle C, touching all four side faces 3 of the cutting insert 10. The thickness of the cutting insert is about 45% of the width, that is roughly 6,35 mm. The cutting insert includes a central clamping hole 11 extending from the top face 1 to a bottom face 2.

As can be seen from FIG. 1C showing a detail from FIG. 1B including the cutting edge and the adjacent chip groove 6 and relief surface 5, the relief surface 5 hereby forms an obtuse inner angle θ with the top face 1. Furthermore, a tangent to a chip groove 6 surface portion adjacent to the cutting edge 4 and the relief surface 5 form an acute inner angle (or wedge angle) of about 85°, which is due to the fact that the relief surface 5, which is formed as a bevel of the side faces 3, 3', is angled by a negative clearance angle δ of about 15° away from the central part of the side faces 3, 3', which in turn is perpendicular to the top face 1, while a tangent of the chip groove surface portion adjacent the cutting edge 4 includes an angle γ of 20° with the top face or a face parallel thereto. As can be seen from FIG. 1B, the cutting edges 4 are located on a slightly lower level than the top and bottom faces 1, 2.

A width b (see FIG. 1B) of a flat surface portion of the side face 3, which extends perpendicular to top and bottom faces 1, 2, amounts to about 60% of the total width of the side faces, which in turn corresponds to the thickness of the insert, and each relief surface 5 is thereby restricted to the portion of the side surface which amounts to about 20% of the thickness.

A land 7 may be provided immediately at the cutting edge, which may for instance have the shape of a flat chamfer of the cutting edge parallel to the top and bottom faces 1, 2, respectively. Alternatively, the cutting edge 4 may be rounded with a small edge rounding (ER) radius <0.2 mm.

The curved dashed lines at one of the acute corners indicated as 8" in FIG. 1A are meant to show the contour of a corner 8" in a top view according to the embodiment which is shown only in FIG. 3 in a perspective view: The extended corner 8" is not present with the embodiments of FIGS. 1 and 2, the contour of which is drawn in full lines in FIGS. 1A and 2B. The embodiment of FIG. 3 is described in the following paragraphs.

FIG. 3 shows a cutting insert 10' according to the present disclosure, which is specially designed to generate relief grooves in the corner regions of crank pins or bearing pins to the oil collars which are defined by radial surfaces extending perpendicular to the peripheral surfaces of the pins.

As already indicated in the description of FIG. 1A and foreshadowed therein, the embodiment of FIG. 3 is characterized by additional extensions defining rounded corners 8", which provide an extension of the cutting edge only on one of the sides delimiting the basically rhombic shape. As can be seen in particular from FIG. 1A, the extended, rounded corner 8" does not project beyond the plane defined by one of the edge surfaces 3 but projects only from the respective other edge surface 3 adjacent an acute angled corner.

Also, the angles ε1 and ε2 at the acute and obtuse corners 8" and 8', respectively (disregarding the extension), are the same as with the embodiment shown in FIG. 1A, i.e. 75° and 105°, respectively. Of course, for both embodiments, i.e. shown in FIG. 1A and FIG. 3, respectively, these angles could be adapted to other negative rake angles α and β of the bottom support surfaces 22 of the insert seats (cf FIGS. 4 and 5) such as to extend within the cylindrical envelope surface or the radial envelope surface of the disc milling cutter. The extended corner 8" of the cutting insert 10' according to FIG. 3 might be formed with a decreasing cross section towards the intermediate plane M such as to avoid contact of the relief surface of the extended corner 8" with the work piece in particular on the side adjacent the straight cutting edge from which the corner extends. Due to the negative radial rake angle, it is still possible to design the cutting insert as a double sided cutting insert having cutting edges on both, the top and the bottom face. And the cross section may again increase from the intermediate plane M to the bottom surface 2 of the cutting insert 10".

The cutting insert 10' according to FIG. 3 may replace some of the inserts provided along the periphery of the milling tool. For instance, every $3^{rd}$, $4^{th}$ or $5^{th}$ cutting insert 10 as shown in FIGS. 4 and 5 may be replaced by a cutting insert 10' according to FIG. 3. The remainder of the cutting insert would still generate the smooth peripheral surfaces of crank pins, bearing pins or cams, while a part of the cutting inserts having the extended corner portions 8" would generate the relief grooves.

In the remainder, and except for the extended corner regions 8", the cutting insert 10' of FIG. 3 may be completely identical to the cutting insert 10 as shown in FIGS. 1A through 2D. In particular, the relief surfaces 5, 5' of this embodiment have the same extension and the obtuse inner angle θ with the top/bottom face, as well as the chip groove 6, which has the same depth, extension and shape and joins the cutting edge 4 at the same acute inner angle as the chip groove 6 shown in FIG. 1C. While in FIG. 3 one of the chip grooves 6 extending from the extended corner 8' is not shown to extend along the full length of the corresponding cutting edge 4, this chip groove 6 may as well extend continuously all around the central planar surface 1a and along the cutting edges as with the embodiment of FIGS. 1A to 2D.

Figure 4A:
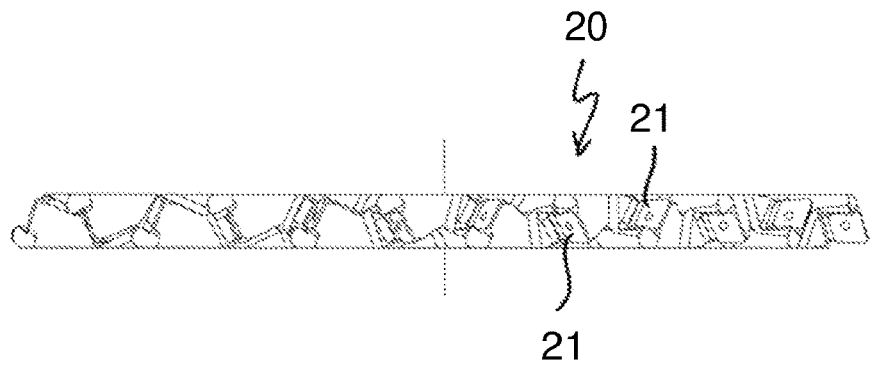
FIGS. 4A-C illustrate a cutting insert holder forming a ring sector body of a disc-shaped crank shaft milling tool of the present disclosure in a radial view towards and away from the ring axis, and a side view, respectively.
Figure 4B:
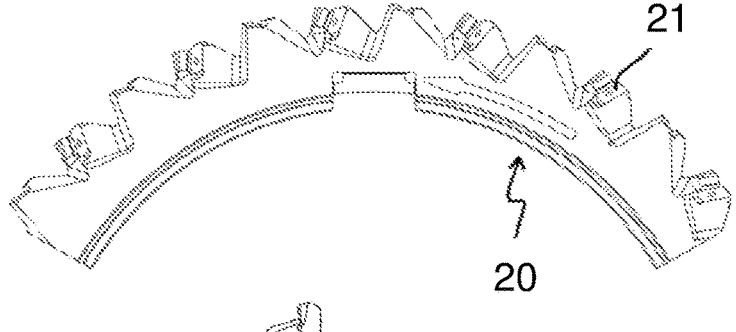
Figure 4C:
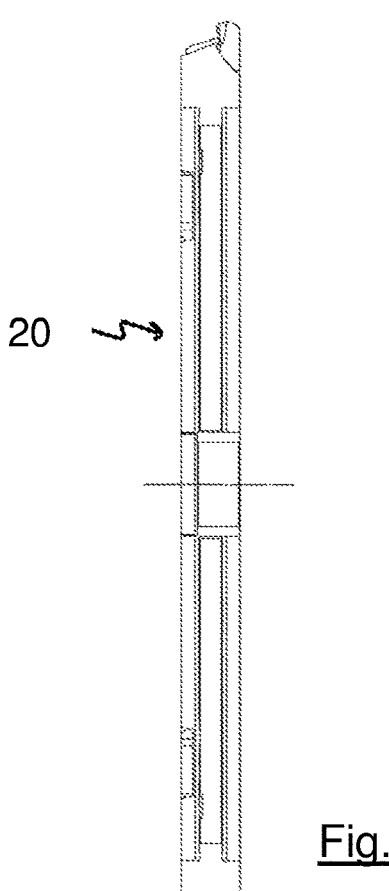
Figure 5A:
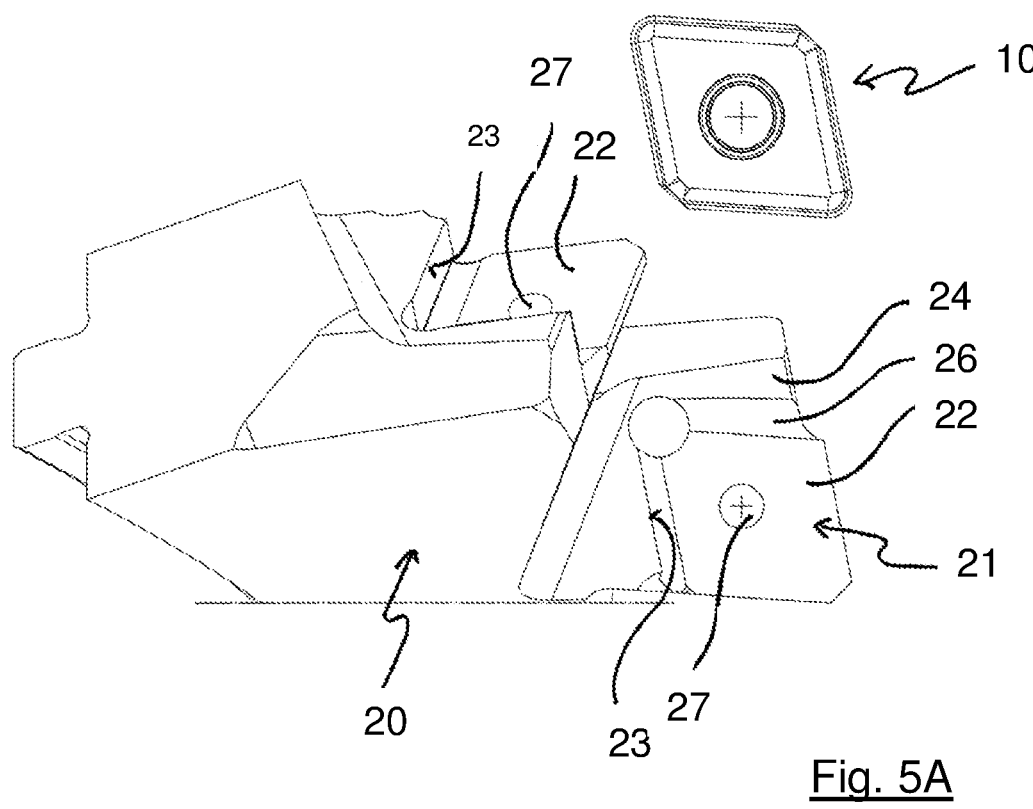
FIGS. 5A and B show enlarged parts of the cutting insert holder of FIG. 4.
Figure 5B:
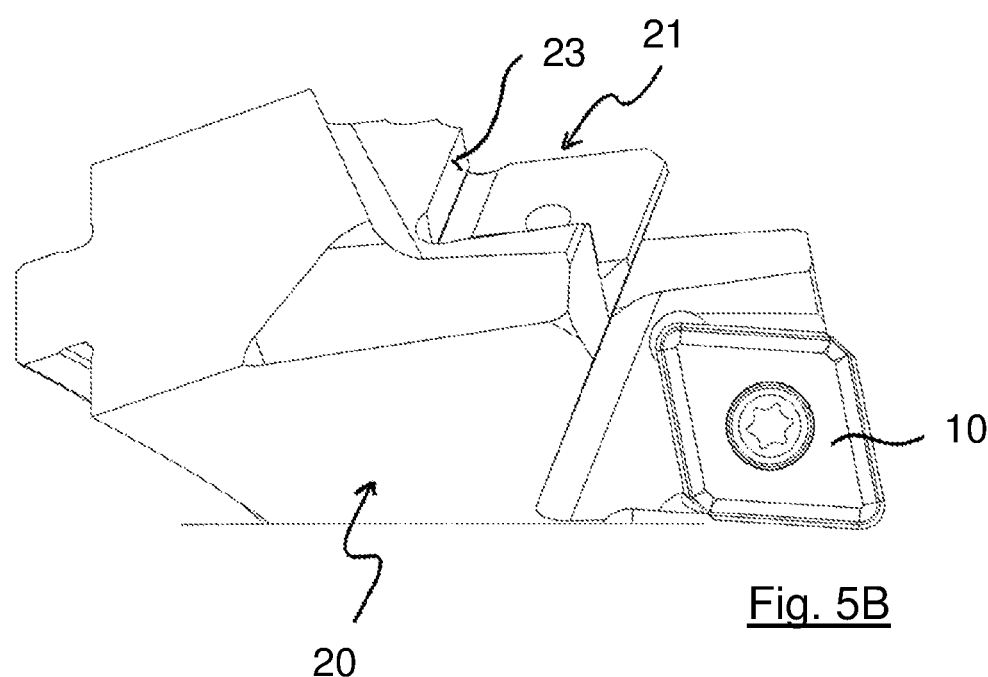

FIGS. 4A to 4C show a cutting insert holder in the form of a ring sector 20 made of steel and having a number of cutting insert seats 21 accommodating cutting inserts 10. Such cutting insert holder/ring sector 20 may be mounted on the periphery of a central disc (not shown) in order to form a complete disc-shaped crank shaft milling cutter together with additional cutting insert holders/ring sectors 20 commonly forming a closed ring (cf. FIG. 8). In the present embodiment, the cutting insert holder/ring sector 20 covers about 120° of the total periphery of a disc-shaped crank shaft milling cutter so that three identical cutting insert holders/ring sectors 20 would make up a complete annular cutting insert holder. The insert seats 21 are provided at the outer periphery of the cutting insert holder/ring sector 20 and they are in particular open towards the axial and the outer radial direction.

FIGS. 4A-4C show different views of the cutting insert holder/ring sector 20 forming part of an outer ring of a disc-shaped milling cutter for crank shaft (or cam shaft) milling. The cutting insert holder/ring sector 20 defines a ring axis 50 (shown in FIG. 8) and is provided on its radial outer side with a number of cutting insert seats 21, which are designed to receive cutting inserts 10 according to FIGS. 1 and 2. The insert seats 21 include a bottom support surface 22 and side support surfaces 23, 24, respectively, as shown in the enlarged part view according to FIGS. 5A and 5B. At the transition from the bottom support surfaces 22 to the side support surfaces 23, 24 as well as at the intersection of the side support surfaces 23, 24 there are provided relief grooves 26 for preventing an undesired contact of the straight and curved cutting edges 4, 4' of cutting insert 10 or 10', respectively, with the support surfaces.

The bottom support surface has a substantially central, threaded clamping hole 27 for receiving a clamping screw (not shown) extending through the central clamping opening 11 of cutting insert 10. The bottom support surface 22 and the side support surfaces 23, 24 are tilted with respect to the axial and radial directions such as to provide the negative axial and radial rake angles of cutting insert 10 when mounted in a corresponding insert seat 21.

For cutting insert 10', a different relief groove (not shown) having a corresponding depth for accommodating the extended corner 8" may be provided at the transition between the side support surfaces 23, 24 within some or all of the insert seats 21.

Figures 6, 7:
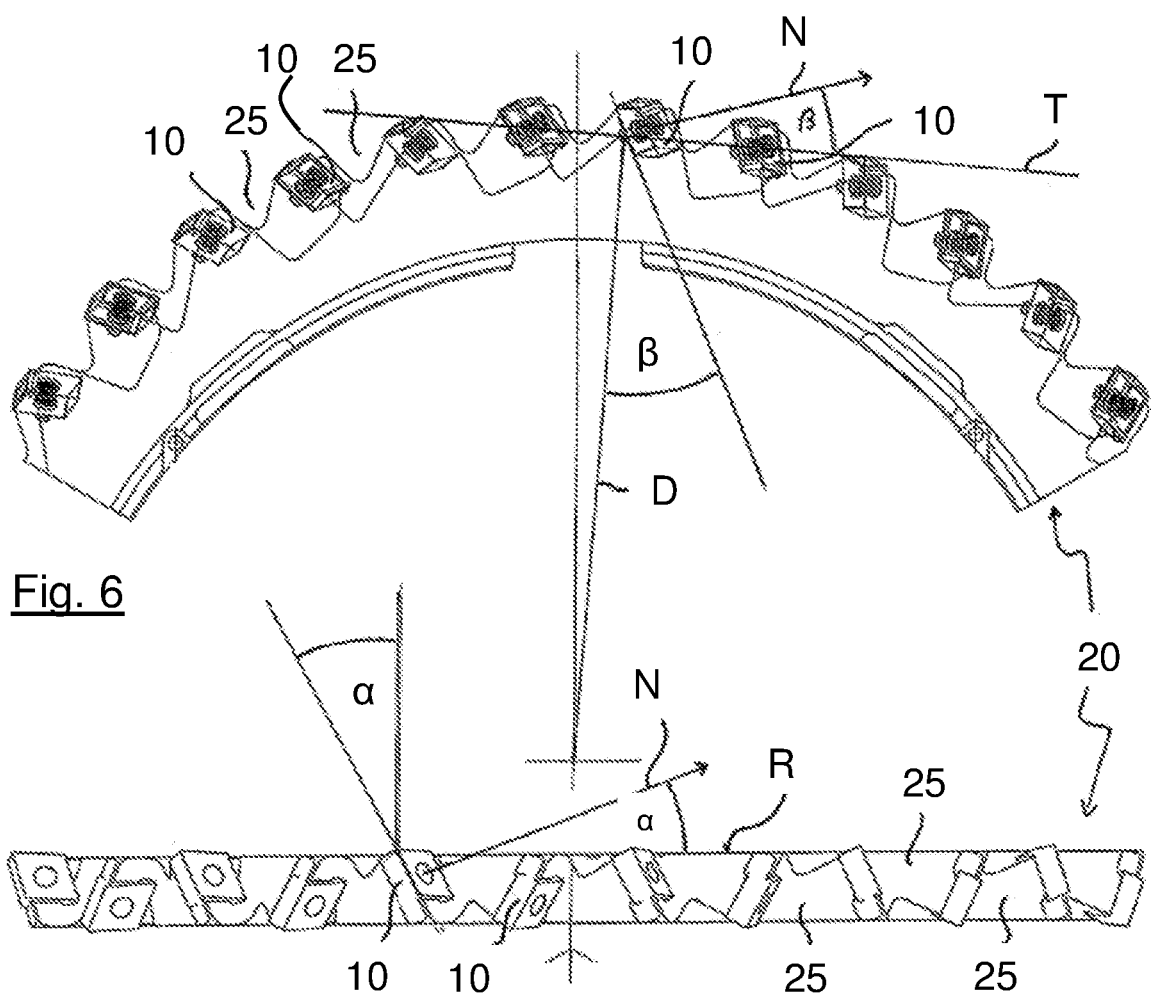
FIG. 6 is a side view of the cutting insert holder of FIG. 4, including cutting inserts.
FIG. 7 is a top view of the cutting insert holder of FIG. 6.

The negative rake angles α and β as defined in the claims as angles between a surface normal N on the bottom support surface 22 of an insert seat and a radial or a tangential plane, respectively, shown in FIGS. 6 and 7, also occur between the active cutting edges 4 adjacent a cutting corner 8 on the one hand, and a normal to the radial plane R and a radius vector D, respectively, on the other hand. The vector N is also a surface normal on the top face 1 of a cutting insert 10 when mounted in the insert seat.

It may be noted, that the negative axial rake angle α with respect to the axis of the disc milling cutter (FIG. 7) will cause that the cutting edge at the periphery of the milling cutter does not exactly extend in a cylindrical envelope surface. Rather, the central part of the cutting edge 4 has a slightly closer distance to the axis of the milling cutter than the ends of the cutting edge near the acute and obtuse corners.

However, in view of the rather short extension of the cutting edge when compared to the radius of a typical disc milling cutter such as used for crank shaft or cam shaft milling, and in view of the still moderate negative axial rake angle, this error is marginal and may be neglected. Still, in order to cope with such deviations from the cylindrical envelope surface, the cutting edges extending on the periphery and predominantly parallel with the tool axis, might be slightly curved in a top view on the cutting insert 10.

As can be realized from FIGS. 4 to 8, there is plenty of chip space 25 in front of each top face 1 of the cutting inserts 10 in spite of the rather narrow pitch of cutting insert seats 21 provided by the present tool, and the central clamping hole 11 is easily accessible without any interference of a corresponding mounting tool with a tool body 25 or any other cutting insert 10, even though the inserts 10 are arranged at a rather close pitch.

FIG. 8A shows a perspective view of a completely assembled annular cutting insert holder 30 comprised of three ring sectors 20 and equipped with cutting inserts 10 according to the present disclosure received in the corresponding insert seats 21. FIG. 8B is a radial view towards the axis 50 of the annular cutting insert holder. FIG. 8C is a side view on the annular cutting insert holder along the axial direction of the ring.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A cutting insert holder for a crank shaft milling tool, the holder comprising:

at least a partly cylindrical body having at least a peripheral surface section and two oppositely arranged radial surfaces adjoining the peripheral surface;

a plurality of cutting insert seats formed as recesses at a transition of at least one of the radial surfaces to the peripheral surface section, each of the insert seats having a bottom support surface and at least two side support surfaces extending perpendicular to the bottom support surface; 5 a cutting insert arranged within each of the insert seats, the cutting insert having a central through hole extending through the cutting insert; wherein the bottom support surface of the seat includes a substantially central threaded clamping hole for receiving a clamping screw extending through the central clamping through hole of the cutting insert, wherein a normal of the bottom support surface points axially and radially away from the at least part cylindrical body at a negative axial rake angle at an absolute value of at least 10° with respect to a radial plane and by a negative radial rake angle at an absolute value of at least 8° with respect to a tangential plane to the peripheral cylindri- 10 15 cal surface at the location of the bottom of the insert seat and extending through the center of the bottom support surface.

2. The cutting insert holder according to claim 1, wherein the absolute value of the negative axial rake angle is larger than 15°, and the absolute value of the negative radial rake angle is more than 12°.

3. The cutting insert holder according to claim 1, wherein the each of the insert seats, which are formed as the recesses at opposite radial surfaces, have a mirror symmetric shape and are arranged without being relatively shifted along a circumferential direction.

4. The cutting insert holder according to claim 1, wherein at least one cutting edge of each cutting insert adjoining an acute angled cutting corner of the cutting inserts extends in a tangential plane, while another cutting edge adjoining the same cutting corner extends within a radial plane.

* * * * *